(12) United States Patent
Zhu et al.

(10) Patent No.: US 8,493,876 B2
(45) Date of Patent: Jul. 23, 2013

(54) METHOD AND APPARATUS FOR REALIZING A TEST

(75) Inventors: Haopeng Zhu, Shenzhen (CN); Rongbin Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 470 days.

(21) Appl. No.: 12/780,701

(22) Filed: May 14, 2010

(65) Prior Publication Data

US 2010/0220628 A1    Sep. 2, 2010

Related U.S. Application Data

(63) Continuation of application No. PCT/CN2008/071655, filed on Jul. 16, 2008.

(30) Foreign Application Priority Data

Nov. 14, 2007    (CN) .......................... 2007 1 0165990

(51) Int. Cl.
*H04L 12/26* (2006.01)
(52) U.S. Cl.
USPC .......................................... 370/252; 370/241
(58) Field of Classification Search
USPC .......... 370/252, 352, 254, 253, 401; 709/224; 714/43
See application file for complete search history.

(56) References Cited

U.S. PATENT DOCUMENTS

| | | | | |
|---|---|---|---|---|
| 6,473,798 B1 * | 10/2002 | Grosser et al. | ................. | 709/224 |
| 2002/0016937 A1 * | 2/2002 | Houh | ............................... | 714/43 |
| 2002/0167937 A1 * | 11/2002 | Goodman | ..................... | 370/352 |
| 2005/0213564 A1 * | 9/2005 | Nguyen et al. | ................. | 370/352 |
| 2005/0265241 A1 * | 12/2005 | Makowski et al. | ........... | 370/241 |
| 2007/0211739 A1 * | 9/2007 | Schrock | ........................ | 370/401 |
| 2008/0198754 A1 * | 8/2008 | Savoor et al. | .................. | 370/245 |
| 2009/0103449 A1 * | 4/2009 | Claise et al. | ................... | 370/253 |

FOREIGN PATENT DOCUMENTS

| | | |
|---|---|---|
| CN | 1558613 A | 12/2004 |
| CN | 1750485 A | 3/2006 |
| CN | 1859234 A | 11/2006 |

(Continued)

OTHER PUBLICATIONS

State Intellectual Property Office of the People'S Republic of China, Examination Report in Chinese Patent Application No. 200710165990.4 (Aug. 21, 2009).

(Continued)

*Primary Examiner* — Chi Pham
*Assistant Examiner* — Fahmida Chowdhury (57) ABSTRACT

A method for realizing a test is provided. The method includes receiving a test signaling and a planning parameter of an internet protocol (IP) bearer network; initiating a test service on the IP bearer network according to the test signaling and the planning parameter of the IP bearer network; and obtaining a performance indicator of the IP bearer network according to the running situation of the test service. An apparatus for realizing a test is also provided. A test service is initiated on the IP bearer network according to the planning parameter of the IP bearer network; and a performance indicator of the IP bearer network is obtained according to a running situation of the test service. According to the performance indicator, it is determined whether the current IP bearer network satisfies the performance requirements of the communication network planning model.

15 Claims, 3 Drawing Sheets

FOREIGN PATENT DOCUMENTS

| | | |
|---|---|---|
| CN | 1881909 A | 12/2006 |
| CN | 1885797 A | 12/2006 |
| CN | 101159742 A | 4/2008 |
| EP | 1 739 900 A1 | 1/2007 |
| KR | 20070061201 A | 6/2007 |
| WO | WO 2007079630 A1 | 7/2007 |
| WO | WO 2009062411 A1 | 5/2009 |

OTHER PUBLICATIONS

State Intellectual Property Office of the People'S Republic of China, International Search Report in International Patent Application No. PCT/CN2008/071655 (Oct. 23, 2008).

First Office Action in corresponding Chinese Application No. 200710165990.4, mailed Aug. 21, 2009.

Extended European Search Report in corresponding European Application No. 08849939.7-2416, mailed Sep. 23, 2010.

Written Opinion in corresponding PCT Application No. PCT/CN2008/071655, mailed Oct. 23, 2008.

"Series G: Transmission Systems and Media, Digital Systems and Networks—Quality of service and performance—End-user multimedia QoS categories," *International Telecommunication Union*, ITU-T Recommendation G.1010 (Nov. 2001).

"Series Y: Global Information Infrastructure, Internet Protocol Aspects and Next Generation Networks—Internet protocol aspects—Quality of service and network performance—Network performance objectives for IP-based services—Amendment 2: New Appendix XI: Concatenating QoS values," *International Telecommunication Union*, ITU-T Recommendation Y.1541, Amendment 2 (Feb. 2004).

Notice of Rejection in corresponding Chinese Patent Application No. 200710165990.4 (Mar. 2, 2012).

3$^{rd}$ Office Action in corresponding Chinese Application No. 200710165990.4 (Oct. 8, 2011).

2$^{nd}$ Office Action in corresponding Chinese Application No. 200710165990.4 (Dec. 21, 2010).

Front page corresponding granted Chinese Patent No. 101159742 (Application No. 200710165990.4) citing prior art at Item (56), issued Dec. 12, 2012, 1 page only.

* cited by examiner

METHOD AND APPARATUS FOR REALIZING A TEST

CROSS REFERENCE TO RELATED APPLICATIONS

The application is a continuation of International Application No. PCT/CN2008/071655, filed on Jul. 16, 2008, which claims priority to Chinese Patent Application No. 200710165990.4, filed on Nov. 14, 2007, both of which are hereby incorporated by reference in their entireties.

FIELD OF THE INVENTION

The present invention relates to the communication field, and more specifically, to a method and an apparatus for realizing a test.

BACKGROUND

Mobile soft-switch core bearer network employs the Internet Protocol (IP) network for the networking. When it is checked whether the bearer network meets the requirements of communication network planning, a transmission apparatus or a receiving apparatus of a test device is respectively connected to each network element (NE) node of an IP network. The test device stimulates and initiates a certain amount of data traffic to the IP network. Thus, a performance indicator of QoS of the IP network can be tested with the data traffic, where the performance indicator of QoS may include but is not limited to, at least one of delay, jitter and packet dropping rate, etc.

Since the test device may only stimulate a certain amount of data traffic which may differ a lot from the data required by the communication network planning, the obtained test result may not truly reflect the situation whether the bearer network complies with the requirements of the communication network planning. In addition, since the test device is connected to the bearer network, the test result may be affected by the performance of the test device itself, and thereby may not accurately reflect the performance indicator of QoS of the IP network either.

SUMMARY

Embodiments of the present invention are aimed at providing a method and an apparatus for realizing a test, so that the test result of a communication network may be more accurate and the planning performance may be more effective.

A method for realizing a test is provided according to an embodiment of the present invention. The method includes:

receiving a test signaling and a planning parameter of an internet protocol (IP) bearer network;

initiating a test service on the IP bearer network according to the test signaling and the planning parameter of the IP bearer network; and obtaining a performance indicator of the IP bearer network according to the running situation of the test service.

An apparatus for realizing a test is further provided according to an embodiment of the present invention. The apparatus includes:

a receiving unit, configured to receive a test signaling and a planning parameter of an IP bearer network;

a service unit, configured to initiate a test service on the IP bearer network according to the received test signaling and the planning parameter of the IP bearer network; and an indicator unit, configured to obtain a performance indicator of the IP bearer network according to a running situation of the test service initiated by the service unit.

Compared with the method of connecting to a test device in each network element node in the prior art, embodiments of the present invention provide the method and the apparatus for realizing a test, with which the testing functionality may be integrated in a control network element node of the IP bearer network, without connecting to any test device. Thus, the test performance is not limited to or affected by the performance of the test device. A test service is initiated on the IP bearer network according to the planning parameter of the IP bearer network; and a performance indicator of the IP bearer network is obtained according to a running situation of the test service. According to the performance indicator, it is determined whether the current IP bearer network satisfies the performance requirements of the communication network planning model. Thus, the planning capability of the communication network is enhanced, and the test accuracy and the test reliability are improved.

DETAILED DESCRIPTION

Figure 1:
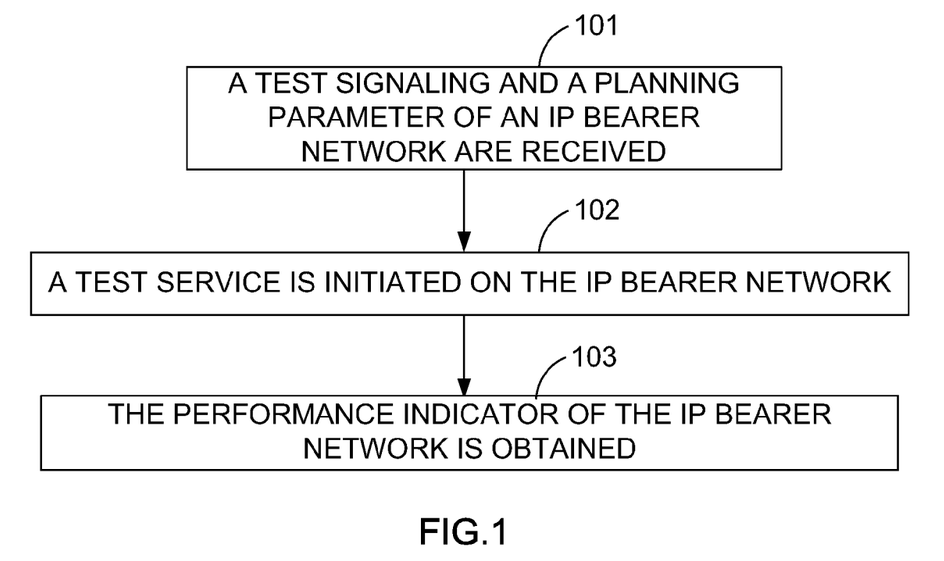
FIG. 1 is a schematic flowchart illustrating a first embodiment of a method for realizing a test according to the present invention.

The first embodiment provides a method for realizing a test. Referring to FIG. 1, the method includes following steps.

101: A test signaling and a planning parameter of an IP bearer network are received.

The test signaling is configured to initiate a task for testing the IP bearer network. Test information serving as the test signaling may be carried in a service message so as to be compatible with the existing network. Furthermore, for improving the test reliability, the test signaling may include a test number. After the test signaling which includes the test number is received, the number included in the test signaling may also be analyzed, i.e., it is analyzed according to the test number whether a real service or a test needs to be conducted. If the test number indicates that it is a terminal, a real service is conducted according to a normal procedure. If the test number indicates that it is an NE node, then a test is conducted.

After the planning parameter of the IP bearer network is received, the validity of the planning parameter of the IP bearer network may also be verified. A corresponding test is conducted after the validity verification is passed, so as to avoid an inaccurate test result incurred by the invalidity of the planning parameter of the IP bearer network, and to improve the accuracy of the test result.

102: A test service is initiated on the IP bearer network according to the test signaling and the planning parameter of the IP bearer network.

The test service may be initiated on the IP bearer network by means of directly transmitting a signaling corresponding to the test service over the IP bearer network, or by means of transmitting a signaling and/or data packets corresponding to the test service over a test tunnel after the test tunnel is established over the IP bearer network.

When the means of transmitting a signaling and/or data packets corresponding to the test service over a test tunnel after the test tunnel is established over the IP bearer network is adopted, step 102 may further include following steps.

1: A corresponding number of test tunnels are established over the IP bearer network according to the test signaling and the planning parameter of the IP bearer network.

In other words, a corresponding number of test tunnels are established among NE nodes in the IP bearer network to be tested, according to the test signaling and the planning parameter of the IP bearer network. The test tunnel may include at least one of a signaling tunnel and a service tunnel.

The NE node therein refers to an entity in the communication network, which may include but is not limited to at least one of a media gateway, a mobile switching center server (MSC server), a service control point (SCP), a home location register (HLR), and a service switching point (SSP), etc.

The planning parameter of the IP bearer network may be telephone traffic corresponding to a call module of the IP bearer network. In this situation, the test tunnels may be established over the IP bearer network in the following ways.

Calls corresponding to the telephone traffic may be initiated on the IP bearer network, and accordingly, a corresponding number of voice tunnels may be established over the IP bearer network. The calls may be initiated in the uniform mode or in the poisson mode.

Furthermore, during the initiation of the calls corresponding to the telephone traffic, encoding/decoding and conversation duration may also be assigned for each call. Each call may be assigned with a different encoding/decoding and/or a different conversation duration.

2. Data packets are transmitted over the test tunnels according to the test signaling and the planning parameter of the IP bearer network.

The data packets may include at least one of service data packets and signaling data packet.

If a service tunnel is established, service data packets are transmitted over the service tunnel. If a signaling tunnel is established, signaling data packets are transmitted over the signaling tunnel.

The service data packets may include but are not limited to at least one of an audio service data packet, a video service data packet, and a data service data packet, etc.

When the planning parameter of the IP bearer network refer to telephone traffic corresponding to a call module of the IP bearer network, transmitting the data packets over the test tunnel may include the step of:

sending request information to the media gateway to request the media gateway to play a piece of voice over the corresponding test tunnel.

103: The performance indicator of the IP bearer network is obtained according to a running situation of the test service. The performance indicator of the IP bearer network may be obtained according to the situation of the corresponding signaling for transmitting the test service in the IP bearer network, or according to the transmission situation of the signaling and/or data packets in the test tunnel over the IP bearer network.

Specifically, the performance indicator of the test tunnel may be obtained according to the transmission situation of the signaling data packets and/or the service data packets in the test tunnel, e.g., packet dropping rate, delay duration, etc. Accordingly, the performance indicator of the corresponding IP bearer network may be obtained.

The performance indicator of the IP bearer network may be obtained according to two schemes below.

Scheme 1: The following steps may be included to obtain the performance indicator of the IP bearer network.

Auditing information is sent to media gateways, requesting for auditing the test tunnels among the media gateways.

Auditing responses reported from the media gateways are received, where the auditing response reported from each media gateway includes transceiving status statistic information of the corresponding media gateway.

A first performance indicator of the IP bearer network between the media gateways is obtained according to the auditing responses. That is, the first performance indicator of the IP bearer network between the media gateways is obtained after the transceiving status statistic information in the auditing responses is aggregated.

When the planning parameter of the IP bearer network refer to telephone traffic corresponding to a call module of the IP bearer network, a quality of voice estimating tool may be configured to test indicators such as a voice definition. The quality of voice estimating tool may be configured outside the media gateway and may function independently, or may be configured in the media gateway and may function in conjunction with the media gateway. After the quality of voice estimating tool is configured, obtaining the performance indicator of the IP bearer network may further include:

receiving a quality of voice indicator reported by the media gateway, where the quality of voice indicator includes a Perceptual Evaluation of Speech Quality (PESQ) indicator, etc.

The first performance indicator may include:

at least one of a first quality of service, and a first bandwidth traffic indicator.

The first quality of service may include:

at least one of packet dropping rate, delay, and jitter.

The first bandwidth traffic indicator may include:

at least one of packet transmitting rate, packet receiving rate, receiving bit rate, and transmitting bit rate.

When the test tunnel is a service tunnel, the performance indicator of the IP bearer network can be obtained according to the method in Scheme 1.

Scheme 2: The following steps may be included to obtain the performance indicator of the IP bearer network.

A detection packet is sent in the IP bearer network.

A response to the detection packet is received.

A second performance indicator of the IP bearer network between the NE nodes in the IP bearer network is obtained according to the detection packet and the response to the detection packet.

In the present embodiment, the detection packet may be a Ping packet.

The second performance indicator of the IP bearer network between the NE nodes in the IP bearer network is obtained according to statistic information of the detection packet and the response to the detection packet, or according to contents carried in the detection packet and the response to the detection packet.

The second performance indicator may include:

at least one of a second quality of service, and a second bandwidth traffic indicator.

The second quality of service may include:

at least one of packet dropping rate, and delay.

The second bandwidth traffic indicator may include:

at least one of packet transmitting rate, packet receiving rate, receiving bit rate, and transmitting bit rate.

When the test tunnel is a signaling tunnel, the performance indicator of the IP bearer network can be obtained according to the method in Scheme 2.

In the situation where the IP bearer network includes both a service tunnel and a signaling tunnel, the performance indicator of the IP bearer network may be synthetically obtained according to the method in Scheme 1 applied in the service tunnel, and the method in Scheme 2 applied in the signaling tunnel.

In the situation where the IP bearer network includes both a service tunnel and a signaling tunnel, the performance indicator of the IP bearer network may also be synthetically obtained according to the method in Scheme 2 applied in the service tunnel and the signaling tunnel respectively.

To increase the practicality of the test method according to the present embodiment, the test tunnel may be released after the performance indicator of the IP bearer network is obtained. Thus, the resource occupied by the test tunnel may be used by other services.

To increase the practicality of the test method according to the present embodiment, the performance indicator may be output after the performance indicator of the IP bearer network is obtained. The performance indicator may be output at a display apparatus, so that a user may check whether the performance indicator satisfies the performance requirements of the communication network planning model. Thus, the planning capability of the communication network is enhanced, and the test accuracy and the test reliability are improved. Alternatively, the performance indicator may be output at an audio apparatus which converts the performance indicator into a corresponding announcement in order to play the performance indicator, so that a user may determine, after hearing the announcement converted from the performance indicator, whether the performance indicator of the IP bearer network satisfies the performance requirements of the communication network planning model. Thus, the planning capability of the communication network is enhanced, and the test accuracy and the test reliability are improved.

The second embodiment provides a method for realizing a test. According to the first embodiment, the method for realizing a test is applicable in various communication networks such as Wideband Code Division Multiple Access (WD-CMA) soft-switch, Code Division Multiple Access (CDMA) soft-switch, Next Generation Network (NGN), and IP Multimedia System (IMS).

Figure 2:
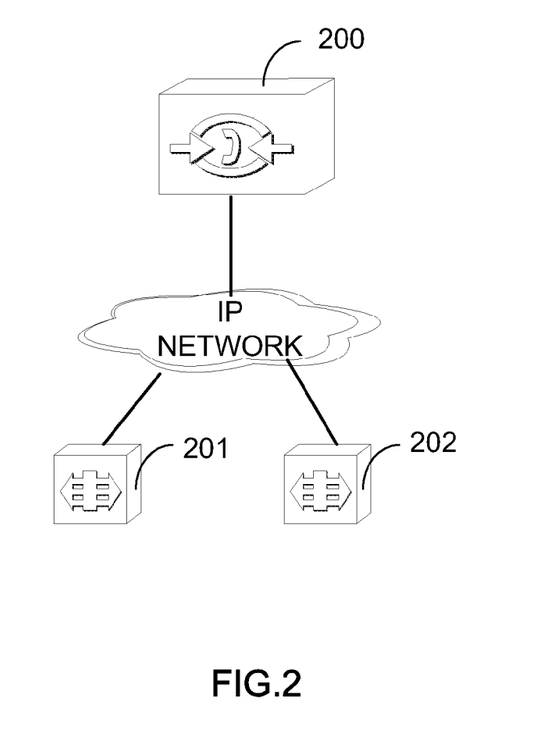
FIG. 2 is a block diagram of an IP network in a second embodiment of a method for realizing a test according to the present invention.

According to the present embodiment, the method for realizing a test in the first embodiment is applied in the WCDMA soft-switch for testing a performance parameter of an IP bearer network between a mobile switching center server (MSC Server) within a testing office (intra-office) and a media gateway (MGW), and/or an IP bearer network between media gateways. Referring to FIG. 2, an NE node of the IP bearer network in the present embodiment includes an MSC server 200, a first media gateway (MGWa) 201 and a second media gateway (MGWb) 202, where the NE nodes may connect with each other via the IP network. In the present embodiment, the method for realizing a test is merely illustrated by taking a situation where the MSC server includes two media gateways as an example. A method for realizing a test where the MSC server includes a plurality of media gateways is identical with that of the present embodiment.

Figure 3:
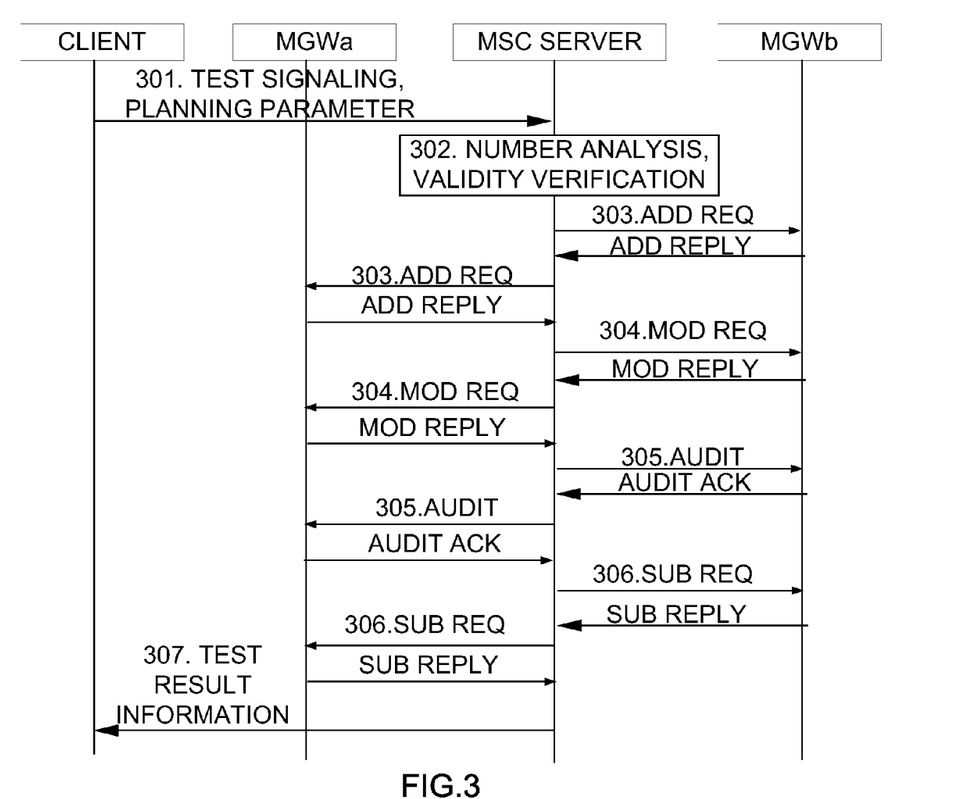
FIG. 3 is a schematic flowchart illustrating the second embodiment of a method for realizing a test according to the present invention.

Referring to FIG. 3, the method for realizing a test according to the present embodiment includes following steps.

301: The MSC server receives a test signaling from a client and a planning parameter of the IP bearer network.

302: The MSC server analyzes the number of the test signaling, and finds that there is a need to perform a call test. Then, the MSC server verifies the validity of the planning parameter of the IP bearer network.

303: After the validity verification is passed, the MSC server stimulates and initiates intra-office calls corresponding to telephone traffic according to the planning parameter of the IP bearer network, sends lots of ADD REQ messages to the MGWs (including MGWa and MGWb), and establishes lots of test tunnels. The calls may be initiated in the uniform mode or in the poisson mode. Each call may be assigned with a different encoding/decoding and/or a different conversation duration.

304: After the test tunnels are established, the MSC server sends a MOD REQ message to the MGWa and the MGWb respectively, requesting for playing a piece of voice to a test tunnel over the MGWa and to a test tunnel over the MGWb respectively, where a voice file played may be configured flexibly.

305: The MSC server sends an auditing message (AUDIT REQ) to the MGWa and the MGWb respectively, requesting for an auditing on Quality of Service (QoS) of the test tunnel between the MGWa and the MGWb, where the MSC server may regularly send an auditing message (AUDIT REQ) to the MGWa and the MGWb respectively since the auditing may be conducted for several times during the test process. Then, the MGWa and the MGWb may report an auditing response message, respectively, where the auditing response message carries transceiving status statistic information of the corresponding media gateway.

And/or, the MSC server starts a Ping function, where a Ping packet is sent to the IP network between the MSC server and the MGWa/MGWb, and a QoS auditing is performed on the test tunnel between the MSC server and the MGWa/MGWb.

306: When a conversation duration of the test call meets the conversation duration corresponding to the planning parameter of the IP bearer network, the MSC server may send to the MGWa and the MGWb a SUB REQ message for releasing the test tunnel over the MGWa and the test tunnel over the MGWb.

307: When a time interval in test result information reported by the test task arrives, the MSC server may aggregate the statistic information in all of the auditing response messages, and send the test result information to the client.

The test result information may include the followings:

1. a second performance indicator and a second bandwidth traffic indicator between the MSC server and the MGWs (including the MGWa and the MGWb), where the second performance indicator may include packet dropping rate, delay (minimum value, maximum value, average value, value in most situations), and second bandwidth traffic indicator may include packet transmitting rate, packet receiving rate, transmitting bit rate and receiving bit rate (minimum value, maximum value, average value, value in most situations);

2. a first performance indicator and a first bandwidth traffic indicator between the MGWa and the MGWb, where the first performance indicator may include packet dropping rate, delay jitter (minimum value, maximum value, average value, value in most situations), and first bandwidth traffic indicator may include packet transmitting rate, packet receiving rate, transmitting bit rate and receiving bit rate (minimum value, maximum value, average value, value in most situations);

3. a quality of voice indicator reported by the MGWa and the MGWb, where indicators (best, worst, average, value in most situations) for the voice PESQ are output by the MGWa and the MGWb via an internal quality of voice estimating tool;

4. successful call rate and call delay of intra-office calls stimulated and initiated by the MSC server.

According to the present embodiment, the second performance indicator meets performance requirements of G.1010 protocol where the media type of the IP bearer network refers to data, and the scenario refers to signaling. Thus, it is confirmed that the IP network between the MSC server and MGWa/MGWb meets the planning requirements of the telecommunication network.

When the first performance indicator meets performance requirements where the media type of the IP bearer network in G.1010 protocol refers to audio, and the scenario refers to voice conversation, it is confirmed that the IP network between the MGWa and the MGWb meets the planning requirements of the telecommunication network.

Figure 4:
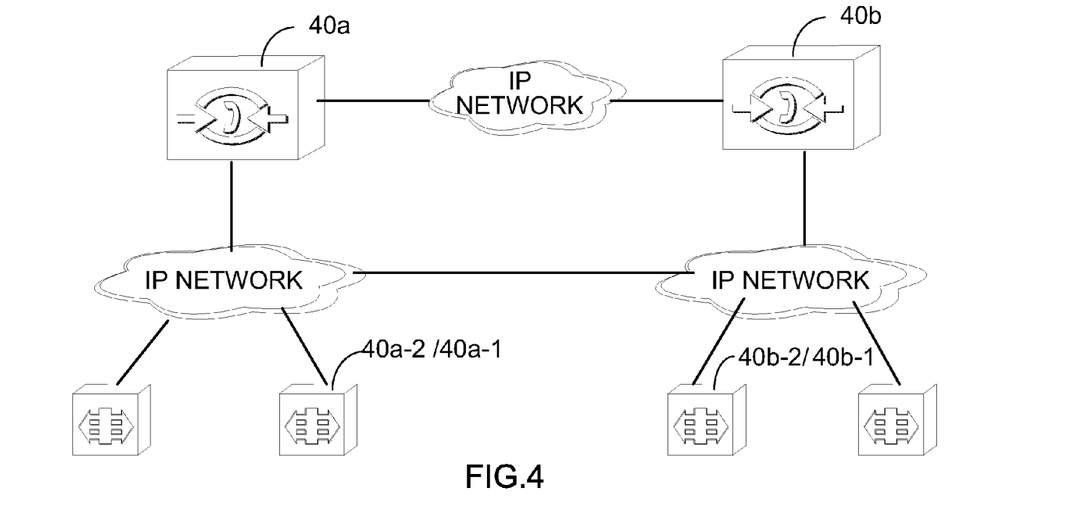
FIG. 4 is a block diagram of an IP network in a third embodiment of a method for realizing a test according to the present invention.

The third embodiment provides a method for realizing a test. In the present embodiment, the method for realizing a test according to the first embodiment is applied in WDCMA soft-switch, for testing a performance parameter of an IP bearer network between each intra-office MSC and media gateway, an IP bearer network between intra-office media gateways, an IP bearer network between MSCs, and an IP bearer network between inter-office media gateways. The number of MSCs and media gateways in the present embodiment is larger than that in the second embodiment, respectively. Referring to FIG. 4, a network element (NE) node of IP bearer networks according to the present embodiment includes a first mobile switching center server (MSC server 40a), a second mobile switching center server (MSC server 40b), a first media gateway (MGW 40a-1), a second media gateway (MGW 40a-2), a third media gateway (MGW 40b-1), and a fourth media gateway (MGW 40b-2). The MGW 40a-1 and the MGW 40a-2 are controlled by the MSC server 40a, while the MGW 40b-1 and the MGW 40b-2 are controlled by the MSC server 40b. The NE nodes are connected with each other via an IP network. In the present embodiment, the method for realizing a test is merely illustrated taking a situation where the NE node includes two mobile switching center servers, and each mobile switching center controls two media gateways as an example.

Figure 5:
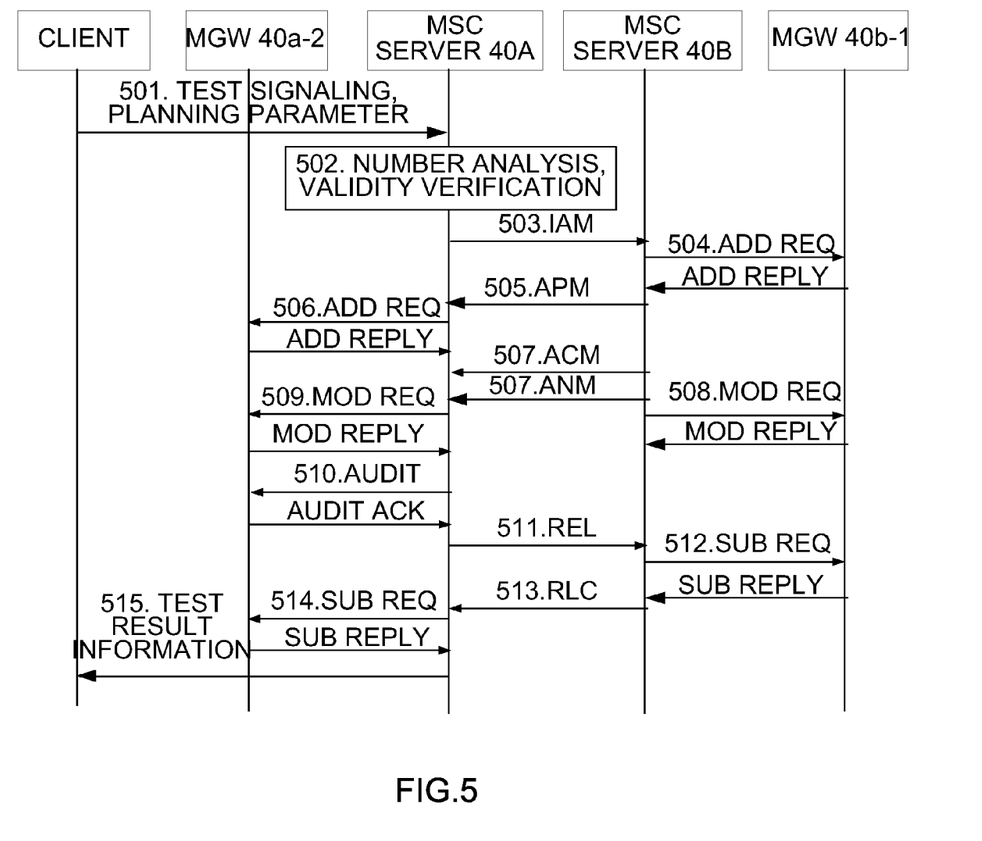
FIG. 5 is a schematic flowchart illustrating the third embodiment of a method for realizing a test according to the present invention.

Referring to FIG. 5, the method for realizing a test according to the present embodiment includes following steps.

In FIG. 5, the procedure of the method for realizing a test according to the present embodiment is merely illustrated taking a situation where the MGW 40a-2 and the MGW 40b-1 are included as an example. A method for realizing a test where a plurality of inter-office media gateways is included is similar to the method for realizing a test where a single inter-office media gateway is included. In other words, the procedure of the method for realizing a test where the MGW 40a-1 and the MGW 40b-2 are included is similar to the method for realizing a test where only the MGW 40a-2 and the MGW 40b-1 are included.

The test for performance parameters of the IP bearer network between an MSC and an HLR is similar to the test for performance parameters of the IP bearer network between MSCs.

501: The local MSC server 40a receives a test signaling from a client and planning parameter of the IP bearer network.

502: The local MSC server 40a analyzes the number of the test signaling, and finds that there is a need to perform a call test. Then, the MSC server 40a verifies the validity of the planning parameter of the IP bearer network.

503: After the validity verification is passed, the local MSC server 40a stimulates and initiates intra-office calls corresponding to telephone traffic according to the planning parameter of the IP bearer network, sends lots of IAM messages to the peer MSC server 40b, where the called number is the test number configured at the test task. The calls may be initiated in the uniform mode or in the poisson mode. Each call may be assigned with a different encoding/decoding and/or a different conversation duration.

504: Upon receiving the IAM message, the peer MSC server 40b analyzes the number, and then finds that it is an incoming call for testing the inter-office IP network. The peer MSC server 40b sends to the MGW 40b-1 and/or the MGW 40b-2 an ADD REQ message for establishing a test tunnel.

505: The peer MSC server 40b replies to the local MSC server 40a an APM message.

If test functionality is not supported by the peer office, the peer MSC server 40b may bypass the call to the local MSC server 40a for processing, i.e., the local MSC server 40a may process the incoming call for testing the inter-office IP network.

506: Upon receiving the APM message, the local MSC server 40a sends to the MGW 40a-1 and/or the MGW 40a-2 an ADD REQ message for establishing a test tunnel.

507: The peer MSC server 40b sends to the local MSC server 40a an ACM message and an ANM message. At this time, a service tunnel between the MGW 40a-2 and the MGW 40b-1, and/or a service tunnel between the MGW 40b-1 and the MGW 40b-2 have been established.

508: After sending to the local MSC server 40a the ACM message and the ANM message, the peer MSC server 40b sends to the MGW 40b-1 and the MGW 40b-2 a MOD REQ message, requesting the MGW 40b-1 and the MGW 40b-2 to play a piece of voice to the test tunnel.

509: Upon receiving the ACM message and the ANM message, the local MSC server 40a sends to the MGW 40a-1 and the MGW 40a-2 a MOD REQ message, requesting the MGW 40a-1 and the MGW 40a-2 to play a piece of voice to the test tunnel.

510: The local MSC server 40a sends an auditing message (AUDIT REQ) to the MGW 40a-1 and the MGW 40a-2 regularly, requesting for an auditing on QoS of the test tunnel over the MGW 40a-1 and the MGW 40a-2. Then, the MGW 40a-1 and the MGW 40a-2 may report an auditing response message, where the auditing response message carries transceiving status statistic information of the corresponding media gateway.

There is a service tunnel between the MGW 40a-1 and the MGW 40a-2, and there is also a service tunnel between the MGW 40a-2 and the MGW 40b-1. The auditing response message reported by the MGW 40a-1 includes the transmission situation of service data packets interacted with the MGW 40a-2. The auditing response message reported by the MGW 40a-2 includes the transmission situation of service data packets interacted with the MGW 40a-1 and the MGW 40b-1. Therefore, the local MSC server 40a may obtain, according to the auditing response messages reported by the MGW 40a-1 and the MGW 40a-2, a first performance indicator between the MGW 40a-1 and the MGW 40a-2 as well as a first performance indicator between the MGW 40a-2 and the MGW 40b-1.

And/or, the local MSC server 40a starts a Ping function, and sends a Ping packet to the IP network between the local MSC server 40a and the MGW 40a-1/MGW 40a-2, and a Ping packet to the IP network between the local MSC server 40a and the peer MSC server 40b. Thus, QoS auditing is performed on the test tunnel between the local MSC server 40a, the media gateway and the MSC.

511: When a conversation duration of the test call meets the conversation duration corresponding to the planning parameter of the IP bearer network, the local MSC server 40a may send to the peer MSC server 40b a REL message, informing the peer MSC server 40b to release the test tunnel.

512: Upon receiving the REL message from the local MSC server 40a, the peer MSC server 40b may send to the MGW 40b-1 and the MGW 40b-2 a SUB REQ message, and release the corresponding test tunnel.

513: After releasing the corresponding test tunnel, the peer MSC server 40b may send to the local MSC server 40a an RLC message.

514: Upon receiving the RLC message from the peer MSC server 40b, the local MSC server 40a may send to the MGW 40a-1 and the MGW 40a-2 a SUB REQ message, and release the corresponding test tunnel.

515: The local MSC server 40a may aggregate the statistic information in all of the auditing response messages, and send the test result information to the client.

Step 508 and step 509 may be performed at the same time. Alternatively, step 508 may be performed before step 509, or step 509 may be performed before step 508.

The test result information may include the followings:

1. a second performance indicator and a second bandwidth traffic indicator between the local MSC server 40a and the MGW 40a-1/MGW 40a-2, where the second performance indicator may include packet dropping rate, delay (minimum value, maximum value, average value, value in most situations), and the second bandwidth traffic indicator may include packet transmitting rate, packet receiving rate, transmitting bit rate and receiving bit rate (minimum value, maximum value, average value, value in most situations);

2. a first performance indicator between the MGW 40a-1 and the MGW 40a-2, a first performance indicator between the MGW 40a-2 and the MGW 40b-1, and a first bandwidth traffic indicator, where the first performance indicator may include packet dropping rate, delay, jitter (minimum value, maximum value, average value, value in most situations), and the first bandwidth traffic indicator may include packet transmitting rate, packet receiving rate, transmitting bit rate and receiving bit rate (minimum value, maximum value, average value, value in most situations);

3. a quality of voice indicator reported by the MGW 40a-1 and the MGW 40a-2; where indicators (best, worst, average, value in most situations) for the voice PESQ are output by the MGW 40a-1 and the MGW 40a-2 via an internal quality of voice estimating tool;

4. successful call rate and call delay (obtained by virtue of transmission delay in a relay signaling) of intra-office calls stimulated and initiated by the local MSC server 40a.

In all the steps mentioned above, the local MSC server 40a and the peer MSC server 40b may be converted with each other. Therefore, in the situation that local MSC server 40a and the peer MSC server 40b may be converted with each other, the first media gateway (MGW 40a-1), the second media gateway (MGW 40a-2), the third media gateway (MGW 40b-1) and the fourth media gateway (MGW 40b-2) may be converted accordingly.

According to the present embodiment, the second performance indicator meets performance requirements where the media type of the IP bearer network in G.1010 protocol refers to data, and the scenario refers to signaling. Thus, it is confirmed that the IP network between the MSC server and MGWa/MGWb meets the planning requirements of the telecommunication network.

With respect to the IP bearer network where an interoffice service is tested, it is determined whether a second performance indicator meets the planning requirements of the telecommunication network by merely testing the second performance indicator of the IP network between a certain mobile switching center server and a corresponding media gateway. Thus, there is no need to test the second performance indicator of the IP networks between all of the mobile switching center servers and the corresponding media gateways.

When the first performance indicator meets performance requirements of G.1010 protocol where the media type of the IP bearer network refers to audio, and the scenario refers to voice conversation, it is confirmed that the IP network between the MGWa and the MGWb meets the planning requirements of the telecommunication network.

The performance requirements of the IP bearer network are specified in the 3GPP G.1010 protocol.

Figure 6:
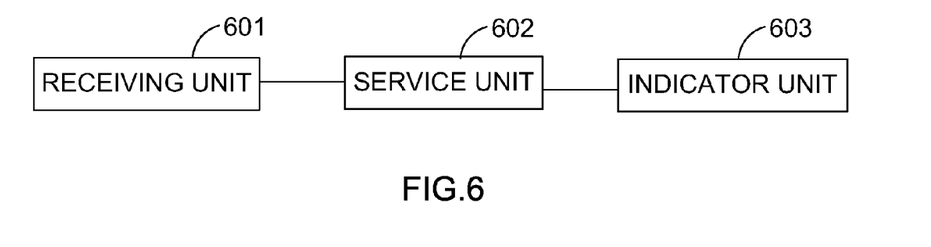
FIG. 6 is a block diagram of an apparatus for realizing a test according to an embodiment of the present invention.

This embodiment provides an apparatus for realizing a test. Referring to FIG. 6, the apparatus includes:

a receiving unit 601, configured to receive a test signaling and a planning parameter of an IP bearer network;

a service unit 602, configured to initiate a test service on the IP bearer network according to the planning parameter of the IP bearer network; and an indicator unit 603, configured to obtain a performance indicator of the IP bearer network according to a running situation of the test service.

The service unit may include:

a tunnel subunit, configured to establish a test tunnel over the IP bearer network; and a data subunit, configured to transmit data packets over the test tunnel according to the test signaling and the planning parameter of the IP bearer network.

The apparatus may further include:

an analysis unit, configured to analyze a test number in the test signaling, and determine to perform a test when the test number indicates that it is a network element node; and/or a verification unit, configured to verify the validity of the planning parameter of the IP bearer network; and/or a releasing unit, configured to release the test tunnel.

The indicator unit may include:

an auditing subunit, configured to send auditing information to a media gateway;

a response subunit, configured to receive the auditing response reported by the media gateway; and a first result subunit, configured to obtain a first performance indicator of the IP bearer network between media gateways according to the auditing response.

The indicator unit may further include:

a voice subunit, configured to receive a quality of voice indicator reported by the media gateway.

Alternatively, the indicator unit may include:

a first subunit, configured to send a detection packet in the IP bearer network;

a second subunit, configured to receive a response to the detection packet; and a second result subunit, configured to obtain a second performance indicator of the IP bearer network between network element nodes in the IP bearer network according to the detection packet and the response to the detection packet.

The apparatus for realizing a test according to the present embodiment can be configured separately, or integrated in a control network element node of the IP bearer network, e.g., integrated in an MSC.

With the description of the foregoing embodiments, it is readily appreciated by those skilled in the art that the present invention may also be implemented with software in combination of a necessary hardware platform, or, of course, may also be entirely implemented with hardware. Based on this understanding, technical solutions of the present invention, or the part which the present invention makes contribution over the background may be embodied in a software product. The computer software product may be stored in a readable storage media such as ROM/RAM, magnetic disc, or optical disc, etc. The software product may include a set of instructions enabling a computer (may be a personal computer, a server, or a network device, etc.) to perform methods according to various embodiments or some parts of the embodiments of the present invention.

The foregoing embodiments are merely some exemplary embodiments of the present invention. It should be noted that several modifications and variations can be made by those skilled in the art without departing from the principle of the present invention. These modifications and variations shall be construed as fall within the scope of the present invention.

What is claimed is:

1. A method for realizing a test, comprising:
   receiving a test signaling and a planning parameter of an internet protocol (IP) bearer network, wherein the planning parameter comprises traffic volume corresponding to a call model of the IP bearer network;
   initiating a test service on the IP bearer network according to the test signaling and the planning parameter of the IP bearer network by
      establishing a test tunnel over the IP bearer network by initiating calls corresponding to the traffic volume,
      establishing a corresponding number of voice tunnels over the IP bearer network, and
      transmitting data packets over the voice tunnels according to the test signaling and the planning parameter; and
   obtaining a performance indicator of the IP bearer network according to a running situation of the test service.

2. The method of claim 1, further comprising:
   assigning at least one of an encoding/decoding and a call duration for each of the calls.

3. The method of claim 1, wherein, the transmitting the data packets over the voice tunnels comprises:
   sending request information to a media gateway to request the media gateway for playing a piece of voice over a corresponding voice tunnel of the voice tunnels.

4. A method for realizing a test, comprising:
   receiving a test signaling and a planning parameter of an internet protocol (IP) bearer network;
   initiating a test service on the IP bearer network according to the test signaling and the planning parameter of the IP bearer network;
   obtaining a performance indicator of the IP bearer network according to a running situation of the test service; and
   performing of:
      analyzing a test number in the test signaling, and determining to perform a test when the test number indicates that it is a network element node;
      verifying a validity of the planning parameter of the IP bearer network; and outputting the performance indicator.

5. The method of claim 1, wherein, the obtaining the performance indicator of the IP bearer network comprises:
   sending auditing information to a media gateway;
   receiving an auditing response reported by the media gateway; and
   obtaining a first performance indicator of the IP bearer network between media gateways according to the auditing response.

6. The method of claim 5, wherein, the obtaining the performance indicator of the IP bearer network further comprises:
   receiving a quality of voice indicator reported by the media gateway.

7. The method of claim 5, wherein, the first performance indicator comprises at least one of a first quality of service and a first bandwidth traffic indicator.

8. The method of claim 7, wherein, the first quality of service comprises:
   at least one of packet dropping rate, delay, and jitter.

9. The method of claim 1, wherein, the obtaining the performance indicator of the IP bearer network comprises:
   sending a detection packet in the IP bearer network;
   receiving a response to the detection packet; and
   obtaining a second performance indicator of the IP bearer network between network element nodes in the IP bearer network according to the detection packet and the response to the detection packet.

10. The method of claim 9, wherein, the network element nodes comprise at least one of a media gateway, a mobile switching center server, a service control point, a home location register, and a service switching point.

11. The method of claim 9, wherein, the second performance indicator comprises at least one of a second quality of service and a second bandwidth traffic indicator.

12. The method of claim 11, wherein, the second quality of service comprises:
   at least one of packet dropping rate, delay, and jitter.

13. An apparatus for realizing a test, comprising:
   a receiving unit, configured to receive a test signaling and a planning parameter of an internet protocol (IP) bearer network;
   a service unit, configured to initiate a test service on the IP bearer network according to the test signaling and the planning parameter of the IP bearer network received by the receiving unit; and
   an indicator unit, configured to obtain a performance indicator of the IP bearer network according to a running situation of the test service initiated by the service unit; and
   an analysis unit, configured to analyze a test number in the test signaling receiving by the receiving unit, and determine to perform a test for the IP bearer network when the test number is a number of a network element node; and
   a verification unit, configured to verify a validity of the planning parameter of the IP bearer network.

14. The apparatus of claim 13, wherein, the service unit comprises:
   a tunnel subunit, configured to establish a test tunnel over the IP bearer network; and
   a data subunit, configured to transmit, according to the test signaling and the planning parameter of the IP bearer network received by the receiving unit, a data packet over the test tunnel established by the tunnel subunit.

15. The apparatus of claim 14, further comprising:
   a releasing unit, configured to release the test tunnel established by the tunnel subunit.

* * * * *